United States Patent [19]

Marom

[11] 4,325,603
[45] Apr. 20, 1982

[54] ELECTRO-OPTIC ANALOG-TO-DIGITAL CONVERTER

[75] Inventor: Emanuel Marom, Pacific Palisades, Calif.

[73] Assignee: Hughes Aircraft Company, Culver City, Calif.

[21] Appl. No.: 949,717

[22] Filed: Oct. 10, 1978

[51] Int. Cl.³ .............................................. G02B 5/14
[52] U.S. Cl. ....................... 350/96.14; 340/347 AD; 350/355
[58] Field of Search ............. 340/347 AD; 350/96.12, 350/96.13, 96.14, 355, 356

[56] References Cited

U.S. PATENT DOCUMENTS

| | | | |
|---|---|---|---|
| 3,909,108 | 9/1975 | Taylor | 350/96.14 |
| 4,012,113 | 3/1977 | Kogelnik et al. | 350/96.13 |
| 4,045,792 | 8/1977 | Schaefer et al. | 340/347 AD |
| 4,058,722 | 11/1977 | Taylor | 250/225 |
| 4,142,775 | 3/1979 | Ramaswamy et al. | 350/96.14 |
| 4,185,274 | 1/1980 | Giallorenzi | 350/355 X |

OTHER PUBLICATIONS

Taylor, "Optical-Waveguide Connecting Networks," *Electronics Letters*, vol. 10, No. 4, Feb. 1974, pp. 41-43.
Soref et al., "Optical Switch Study," Report No. RADC-TR-75-3 (DOD), Feb. 1975, pp. i, ii, 17, 19, 43-46.
Wright et al., "High-Speed Electro-Optic Analogue-Digital Conversion," *Electr. Ltrs.*, vol. 10, Nov. 1974, pp. 508-509.
Smith et al., "A Bistable Fabry-Perot Resonator," *Applied Physics Ltrs.*, vol. 30, No. 6, Mar. 1977, pp. 280-281.
Smith et al., "Nonlinear Electro-Optic Fabry-Perot Devices . . .," *Optics Letters*, vol. 2, No. 3, Mar. 1978, pp. 55-57.
Smith et al., "Integrated Bistable Optical Devices," *Applied Physics Ltrs.*, vol. 33, Jul. 1978, pp. 24-25.

*Primary Examiner*—John K. Corbin
*Assistant Examiner*—John D. Lee
*Attorney, Agent, or Firm*—Kenneth W. Float; William H. MacAllister

[57] ABSTRACT

Apparatus is disclosed for digitizing an applied analog signal. A plurality of closely-spaced parallel optical waveguide pairs are disposed in an electro-optic crystal substrate. A laser source applies light energy simultaneously to one waveguide of each waveguide pair. Electrical conductors disposed on the substrate and connected to a source of an analog signal apply signals therefrom across a coupling region of each of the plurality of waveguide pairs so as to induce coupling of the laser energy between one waveguide and the other waveguide of each of the pairs. The coupling regions are of different lengths for each of the waveguide pairs, the lengths of the coupling regions being related in a predetermined manner. The coupling is proportional to the applied analog signal and to the lengths of the coupling regions. A comparator is disposed so as to compare the output of both waveguides of each of the waveguide pairs and provide a digitized signal therefrom.

11 Claims, 4 Drawing Figures

Fig. 3.
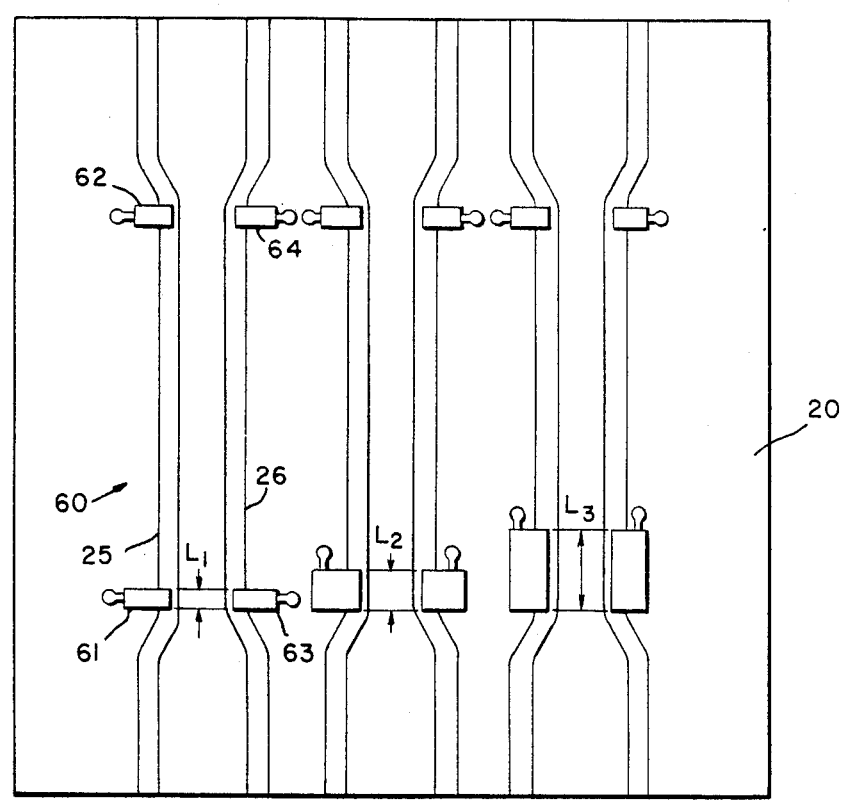
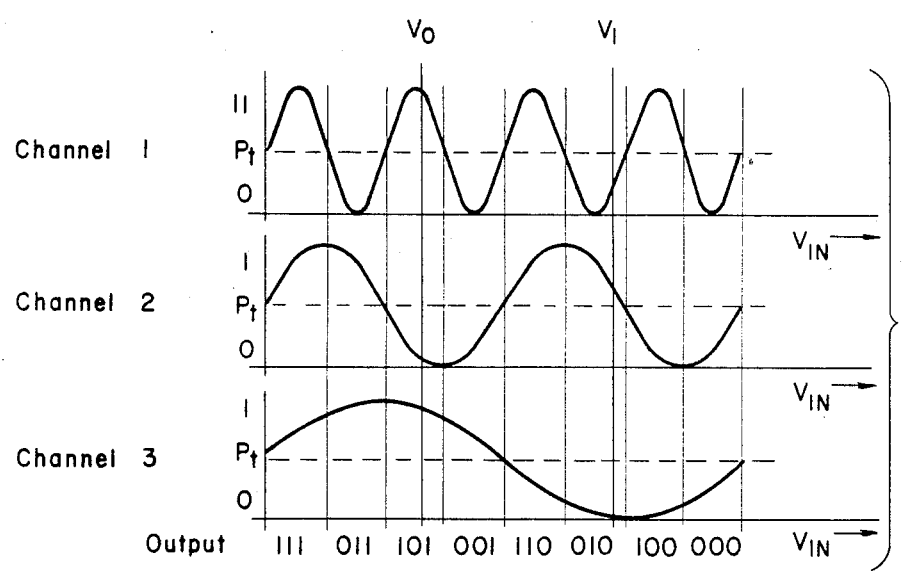
Fig. 4.

ELECTRO-OPTIC ANALOG-TO-DIGITAL CONVERTER

BACKGROUND OF THE INVENTION

This invention relates generally to analog to digital converters and, more specifically, to electro-optic analog-to-digital converters.

Heretofore electronic analog-to-digital converters have been widely used in the industry and may be of the type described by D. F. Hoeschele, Jr. in the text entitled, "Analog to Digital, Digital to Analog Conversion Techniques," published by Wiley in 1968. These are widely used in present day technology to translate sensor measurements of an analog nature into digital language for computing and data processing. However, the maximum speed of operation or output data rate of a typical electronic A/D converter is on the order of 100 megahertz, while the present invention will allow data rates in the gigahertz range.

The use of electro-optic grating type of light beam deflectors for analog to digital conversion was reported by S. Wright, I. M. Mason, and M. G. F. Wilson in an article entitled, "High Speed Electro Optic Analogue-Digital Conversion," published in Electronics Letters, Vol. 10, pp 508–509, Nov. 28, 1974. The grating light beam deflector type of device offers the desirable potential of high speed operation, but unfortunately is inherently limited to the maximum precision of only 3 bits of binary representation.

H. F. Taylor in U.S. Pat. No. 4,058,722 for "Electro Optic Analog/Digital Converter" issued Nov. 15, 1977, has described what is considered to be the most relevant prior art in the field. This patent discloses using a plurality of single dielectric channel optical waveguides fabricated in a single crystal of electro-optic material. Electrodes are disposed on the crystal substrate adjacent to each optical waveguide, for impressing electrical fields thereacross. Linearly polarized laser light energy is applied to each waveguide and an analog signal is applied to the electrodes. The application of the analog signal causes a phase shift and resultant change of polarization in the laser energy which can be detected as a representation of a binary 1 or binary 0 for each of the waveguides. The resultant binary output is the multiple bit analog-to-digital conversion of the analog signal impressed upon the converter.

This technique, however, requires that a polarizing beam splitter be used at the output prior to the comparator and this prior art A/D converter is slower than the A/D converter of the present invention. The beamsplitter is required because the polarization state of the laser energy determines the digitization of the applied analog signal. Thus the two orthogonal components of the energy must be separated to provide this digitization. Additionally, the single waveguide system presumes that the two orthogonal polarizations which define the 0 and 1 binary representation have equal velocity of propagation in the waveguide. However, no isotropic guide has been developed yet.

Thus, it is an object of the present invention to provide an analog to digital converter which operates at a very high speed.

It is a further object of the present invention to provide an electro-optic A/D converter which is not dependent upon the waveguides being isotropic.

Yet another object is to provide an electro-optic A/D converter which is not dependent upon the polarization of the applied laser energy.

SUMMARY OF THE INVENTION

In accordance with these and other objects of the present invention an electro-optic analog-to-digital converter is provided which includes an electro-optic crystal substrate having disposed thereon a plurality of closely-spaced parallel optical waveguide pairs. A laser source is provided for simultaneously applying laser energy to one waveguide of each of the waveguide pairs. Electrical conductors are disposed on the substrate and connected to a source of an analog signal for simultaneously applying the analog signal across a coupling region of each of the plurality of waveguide pairs so as to induce coupling of the laser energy between one waveguide and the other waveguide of each of the waveguide pairs. The coupling regions are of different lengths for each of the waveguide pairs, the lengths of the coupling regions being related in a predetermined manner. The coupling is proportional to both the applied analog signal and the lengths of the coupling regions. Comparators are provided at the output of each of the waveguide pairs for comparing the output of both waveguides and providing a digitized signal therefrom.

Two specific embodiments are disclosed wherein the electrical conductors of the first embodiment comprise elongated signal conductors and elongated ground return conductors disposed adjacent to the waveguide pairs, the signal conductors extending a predetermined distance into the space between the closely-spaced parallel waveguide pairs, and the ground return conductors extending along the outside of each waveguide of the waveguide pairs.

In the second specific embodiment the electrical conductors comprise signal conductors and ground return conductors overlaying the the waveguide pairs. The signal conductors overlay a predetermined portion of one waveguide of each waveguide pair and ground return conductors overlay a predetermined portion of the other waveguide of each of the waveguide pairs.

BRIEF DESCRIPTION OF THE DRAWINGS

The invention, including its various objects, features and advantages, may be more readily understood with reference to the following detailed description of two embodiments, taken in conjunction with the accompanying drawings, wherein like reference numerals designate like structural elements, and in which:

FIG. 3 is a view of a second embodiment of a component for use in the analog-to-digital converter of FIG. 1; and FIG. 4 shows graphs of amplitude versus applied voltage for the three channels of the analog-to-digital converter of FIG. 1.

DETAILED DESCRIPTION OF THE INVENTION

Figure 1:
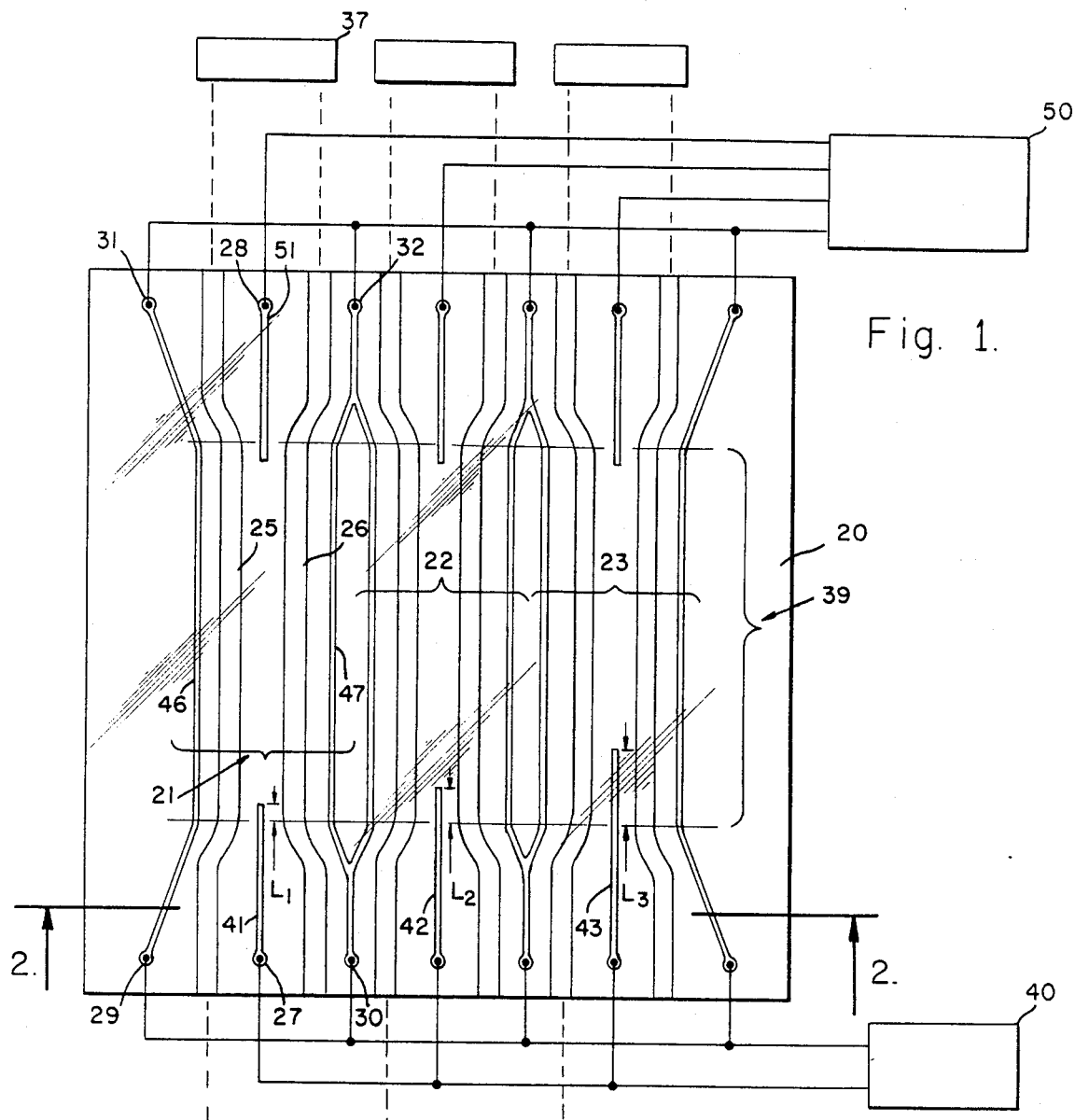
FIG. 1 is a schematic view of an analog-to-digital converter made in accordance with the present invention.

Referring to FIG. 1 of the drawings, there is shown a schematic representation of an embodiment of the present invention. There is provided an electro-optic analog-to-digital converter comprising an electro-optic crystal substrate 20 having three electro-optic dielectric waveguide channels 21, 22, 23 disposed therein, each channel 21, 22, 23 having closely-spaced parallel interaction portions generally defined by bracketed region 39. Also shown are signal, bias and ground return conductors, voltage sources and various input and output devices.

The substrate 20, which may be made of lithium niobate, lithium tantalate, or the like, is a linear electro-optic crystal which supports a plurality of electro-optic dielectric waveguides. Three channels 21-23 are shown, but the present invention is not limited to that number. Any number of channels may be provided and operated simultaneously. All channels 21-23 are substantially identical except for the length of signal conductors 41-43.

A typical channel 21 comprises two electro-optic dielectric waveguides 25, 26, signal conductor 41, bias conductor 51, two ground return conductors 46, 47 and six connectors 27-32. Additionally, external to the substrate 20, there is a laser source 35, a trigger source 36 and a comparator 37.

The waveguides 25, 26 are disposed in the substrate 20 by means of a diffusion or deposition process, or the like. The waveguides 25, 26 are made of a material which has a high index of refraction as compared to the substrate 20, so as to support the propagation of light energy therewithin by total internal reflection. Typical of this material is titanium, or the like.

The waveguides 25, 26 are disposed so as to have sections thereof which are substantially parallel to each other separated by a predetermined distance. This parallel section is called the interaction or coupling region 39. The waveguides 25, 26 are formed so as to separate outside the interaction region 39. This is to facilitate efficient coupling of the laser source 35 and the comparator 37 to the waveguides 25, 26. Additionally, the separation of individual waveguides 25, 26 allows placement of connectors 27-32 on the substrate 20 which allows for external connection of signal and bias conductors 41, 51 and ground conductors 46, 47 to respective voltage and bias sources 40, 50.

The general configuration of the waveguides 25, 26 is not critical except for the interaction region 39. Thus, whatever configuration is most efficient to couple the laser source 35, and comparator 37 to the waveguides 25, 26 for a particular application may be employed.

Referring again to the first channel 21, four conductors are shown. These include a signal conductor 41, bias conductors 51 and two ground return conductors 46, 47. The conductors 41, 46, 47, 51 are deposited by a diffusion or deposition process, or the like, as are the waveguides 25, 26.

The conductors 41, 46, 47, 51 are disposed adjacent to the waveguides 25, 26 for impressing electric fields thereacross upon application of voltages thereto. They may be made of any electrically conductive material compatible with the diffusion process and substrate 20. A metal such as aluminum, or the like, may be used.

The signal conductor 41 is disposed so as to extend into the parallel gap between the two waveguides 25, 26 which is the interaction region 39. The signal conductor 41 extends into the interaction region 39 a predetermined distance $L_1$. This distance is measured from a point at which the waveguides 25, 26 become parallel, as indicated by the dashed line and the identified distance marked $L_1$.

Referring now to the second and third channels 22, 23, the signal conductor for the second channel 22, conductor 42, extends into its respective gap a distance $L_2$ which is twice the distance of extension of the conductor 41 of the first channel 21. The signal conductor 43 of the third channel 23 extends into its respective gap a distance $L_3$ which is four times the distance of $L_1$.

Similarly, additional channels may be provided having signal conductors whose length is determined by the relation $L_n = 2^{n-1} L_1$, where $n = 1, 2, 3 \ldots$ is the number of the channel. Thus, the lengths of the voltage electrodes are related in a binary manner, which allow for ultimate binary digital output from the device.

The bias conductor 51 of the first channel 21 extends into the gap between the waveguides 25, 26 in the interaction region 39 a predetermined distance. The bias conductors of the second and third channels 22, 23 extend into their respective gaps substantially the same distance.

Additionally, two ground return conductors 46, 47 are disposed adjacent to the outside edges of the waveguides 25, 26 of the first channel 21. These conductors are common ground returns for the voltage and bias signals applied to the voltage and bias sources 40, 50. Similarly, two ground return conductors are provided for each of the other two channels 22, 23.

The connectors 27-32 are disposed in the available substrate area between the waveguides 25, 26 and between channels 21, 22 outside the interaction region 39. The connectors 27-32 facilitate connection from the voltage and bias sources 40, 50 to the signal and bias conductors 41, 51 and ground return conductors 46, 47. The connectors 27-32 may be of a pad-type arrangement made of aluminum, or the like, and are conductively connected to the signal and bias conductors 41, 51 and conductors 46, 47. The pads are deposited onto the substrate with the conductors.

In a typical configuration the substrate 20 is 25 mm by 12 mm; the width of a waveguide 25 is 2 μm; the gap between waveguides 25, 26 is 3 μm; the width of a typical conductor 41 is 2 μm, $L_1 = 1/80$ mm; $L_2 = 1/40$ mm, $L_3 = 1/20$ mm; and the length of the interaction region is about 18 mm; which would support at least eight channels.

The voltage source 40 is conductively connected to each of the three signal conductors 41-43 of the three channels 21-23 by means of the connectors 27, 29, 30. The signals applied from the voltage source 40 are digitized during operation of the converter. Typical of a voltage source 40 is a receiver, transducer, communications link, or the like. The bias source 50 applies bias signals in a separate manner to the bias conductor 28 and ground return conductors 46, 47 of the first channel 21 and the corresponding conductors of the second and third channels 22, 23. The bias voltage signals are employed to compensate for differences in the respective channels 21-23 due to fabrication irregularities, deviations, impurities, or the like.

The laser source 35 of the first channel 21 emits a laser pulse on command from the trigger source 36, as do the laser sources in the second and third channels 22, 23. A typical laser source is a laser diode made of gallium arsenide, or the like, manufactured by Laser Diode Labs, Model LD 60. The laser source 35 is disposed so as to transmit its laser pulse in an efficient manner into a single waveguide 25 of the first channel 21. Similarly, the other two laser sources are disposed to emit pulses into only one waveguide of their respective channels 22, 23.

The comparator 37 is disposed so as to receive light output from both waveguides 25, 26 of the first channel 21. The comparator 37 compares the relative intensities of two signals, providing an output signal representing a "low" or "high" condition. A comparison of signals from the two waveguides 25, 26 of the first channel 21 provides a digitized output therefrom.

Either an electronic or optical comparator may be used. Typical of optical comparators which may be used are those described in three papers by P. W. Smith, et al. The first is entitled "Nonlinear Electro-Optic Fabry-Perot Devices Using Reflected Light Feedback," Optics Letters, Vol. 2, No. 3, March 1978; the second is "A Bistable Fabry-Perot Resonator," Applied Physics Letters, Vol. 30, No. 6, Mar. 15, 1977; and the third is "Integrated Bistable Optical Devices," Applied Physics Letters, Vol. 33, P. 24, July 1978. A suitable highspeed electronic comparator is advanced Micro Devices, Model AM685HL electronic comparator.

Figure 2:
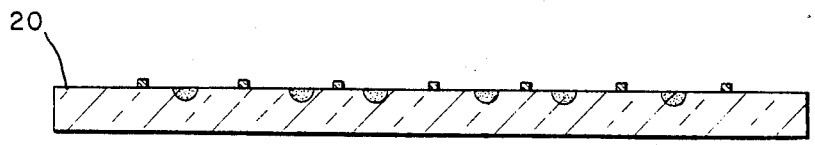
FIG. 2 is a cross-sectional view of the analog-to-digital converter of FIG. 1 taken through the lines 2—2.

FIG. 2 is a cross-sectional view of the A/D converter of FIG. 1 taken through lines 2—2. FIG. 2 shows the configuration and relative location of the substrate 20, conductors and waveguides.

In operation, trigger source 36 triggers a laser pulse from the laser source 35. The laser energy output therefrom is optically coupled so as to be transmitted to the input of waveguide 25 of the first channel 21. Similarly, laser pulses are triggered in the laser sources of the second and third channels 22, 23 which are coupled to their respective individual waveguides.

The light energy is transmitted along the waveguide 25 by the process of total internal reflection. In the absence of an applied signal from the voltage source 40, reduced coupling to the respective parallel waveguide 26 may occur. This is due to the close spacing of the waveguides 25, 26. To compensate for this, bias signals are applied from the bias source 50 to equalize the output from both waveguides 25, 26.

Applying a signal from the voltage source 40 to the conductors 41, 46, 47 causes the coupling between waveguides to be enhanced via the change of the refractive index of the substrate 20 material between the waveguides 25, 26. The laser energy is coupled to the other waveguide 26 of the first channel 21 which provides an output signal from that respective waveguide 26 in a manner proportional to the applied voltage signal from the voltage source and the length that the signal conductor 41 extends into the coupling region. Similarly, coupling occurs in the second and third channels 22, 23 in substantially the same manner.

The coupling and digitization is best shown in FIG. 4. Therein is shown graphs of light intensity of one waveguide of each channel 21-23 versus applied voltage from the voltage source 40. The output of the other waveguide is the complement of the signal shown for each channel.

For an arbitrary applied voltage ($V_{in}$) equal to $V_0$, the corresponding digitized output is 101 as indicated below the graphs. Similarly, for an applied voltage ($V_{in}$) equal to $V_1$, the corresponding digitized output is 010, and so forth.

Thus, for any voltage input there is a corresponding digitized output as indicated by FIG. 4. The comparators receive these signals and provide a fixed voltage for any intensity above the value $P_t$ which corresponds to a "one" or "high" condition, and provide a "zero" or "low" condition for intensity values below the $P_t$ value of intensity.

The comparator 37 of the first channel 21 is adapted to receive the output from the waveguides 25, 26 and compare the amplitudes of the respective signals received therefrom. If the signal in the first waveguide 25 is greater than that of the second waveguide 26, the output from the comparator 37 is a fixed voltage representing a "high" condition. If the voltage in the second waveguide 26 is greater than that of the first waveguide 25, then the comparator 37 provides a second fixed voltage representing the "low" or ground state. The comparators of the second and third channels 22, 23 provide similar output voltages for their respective channels.

The bias conductors impress separate voltages upon each channel 21-23 to correct for differences between the channels due to manufacturing inconsistencies, or the like. The applied voltages equalize the outputs from all channels in the absence of an applied signal from the voltage source 40.

In a typical operational situation the laser sources are pulsed at a rate of 100 million pulses per second. The applied signals from the voltage source 40 is several volts while the bias voltages from the bias source 50 are on the order of 2-3 volts.

A second embodiment of the present invention is shown in FIG. 3. Therein is shown a substrate 20 having disposed therein a plurality of optical waveguides and a plurality of electrical conductors overlaying the waveguides in the interaction regions of the respective channels.

The first channel 60 includes two waveguides 25, 26 and signal, bias and ground return conductors 61, 62, 63, 64 (numbered respectively). The signal conductor 61 and its ground return conductor 63 are deposited on the substrate 20 as in the manner described in connection with the first embodiment. These conductors 61, 63 extend along the interaction region of the first channel 60 a distance $L_1$ and overlay the waveguides 25, 26 a predetermined distance (approximately ⅔ of the width of the waveguide). The bias and ground return conductors 62, 64 of the first channel 60 along with the remaining conductors of the other channels are disposed in a similar manner.

The signal conductors of the remaining channels extend into the interaction region distances $L_2$ and $L_3$ as in the first embodiment. Additionally, these conductors overlay their respective waveguides by the predetermined distance, as do the bias conductors.

The operation of this embodiment is substantially the same as that described in connection with the first embodiment.

Thus, there has been described an improved electro-optic analog-to-digital converter which operates at a very high speed and which is not dependent upon the waveguides being isotropic or the polarization of the applied laser energy.

We have described the use of a pulsed laser device or laser diode as the laser source, but we do not want to be limited to this. A CW laser may be used if the comparator samples the output at discrete times.

Fabrication of the waveguides and conductors may be made in any manner conductive to ease of fabrication and coupling of the input and output devices to the waveguides and conductors.

The bias source and related conductors and connection may not be required if fabrication techniques improve to the point where two parallel guides of a channel are optically and electronically identical.

Additionally, a binary digital A/D converter has been described but the device is not limited to that. Digitization in any number system may be achieved by appropriate sizing of the lengths of the signal conductors to correspond to the correct ratio for any particular number base system.

It is to be understood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What is claimed is:

1. A component for an electro-optic analog-to-digital converter comprising:
   an electro-optic crystal substrate;
   a plurality of closely-spaced parallel optical waveguide pairs disposed in said substrate; and
   electrical conductors disposed on said substrate adjacent said pairs, said conductors comprising signal conductors and ground return conductors, the proximity of said signal conductors to said pairs defining a coupling region of each of said pairs, said signal conductors and said coupling regions being of different lengths for each of said pairs, the lengths of said signal conductors and said coupling regions being related in a predetermined manner.

2. An electro-optic analog-to-digital converter for digitizing an applied analog signal comprising:
   a source of an analog signal;
   an electro-optic crystal substrate;
   a plurality of closely-spaced parallel optical waveguide pairs disposed in said substrate;
   laser means for simultaneously applying laser energy to one waveguide of each of said waveguide pairs;
   electrical conductors disposed on said substrate and connected to said source of an analog signal for simultaneously applying said analog signal across each of said plurality of waveguide pairs so as to induce coupling of said laser energy between said one waveguide and the other waveguide of each of said waveguide pairs, said coupling being proportional to said applied analog signal; and
   means responsive to the output of said waveguide pairs for comparing the output of both waveguides of said waveguide pairs and providing a digitized signal therefrom.

3. An electro-optic analog-to-digital converter for digitizing an applied analog signal comprising:
   a source of an analog signal;
   an electro-optic crystal substrate;
   a closely-spaced parallel optical waveguide pair disposed in said substrate;
   a laser source;
   means for applying laser energy from said laser source to one waveguide of said waveguide pair;
   electrical conductors disposed on said substrate and connected to said source of an analog signal for applying said analog signal across said waveguide pair so as to induce coupling of said laser energy between said one waveguide and the other waveguide of said waveguide pair, said coupling being proportional to said applied analog signal; and
   means responsive to the output of said waveguide pair for comparing the output of both waveguides of said waveguide pair and providing a digitized signal therefrom.

4. An electro-optic analog-to-digital converter for digitizing an applied analog signal comprising:
   a source of an analog signal;
   an electro-optic crystal substrate;
   a plurality of closely-spaced parallel optical waveguide pairs disposed in said substrate;
   a laser source;
   means for simultaneously applying laser energy from said laser source to one waveguide of each of said waveguide pairs;
   electrical conductors disposed on said substrate and connected to said source of an analog signal for simultaneously applying said analog signal across each of said plurality of waveguide pairs so as to induce coupling of said laser energy between said one waveguide and the other waveguide of each of said waveguide pairs, said coupling being proportional to said applied analog signal; and
   means responsive to the output of said waveguide pairs for comparing the output of both waveguides of said waveguide pairs and providing a digitized signal therefrom.

5. An electro-optic analog-to-digital converter for digitizing an applied analog signal comprising:
   a source of an analog signal;
   an electro-optic crystal substrate;
   a plurality of closely-spaced parallel optical waveguide pairs disposed in said substrate;
   a laser source;
   means for simultaneously applying laser energy from said laser source to one waveguide of each of said waveguide pairs;
   electrical conductors disposed on said substrate and connected to said source of an analog signal for simultaneously applying said analog signal across a coupling region of each of said plurality of waveguide pairs so as to induce coupling of said laser energy between said one waveguide and the other waveguide of each of said waveguide pairs, said coupling regions being of different lengths for each of said waveguide pairs, the lengths of said coupling regions being related in a predetermined manner, said coupling being proportional to said applied analog signal and to the lengths of said coupling regions; and
   means responsive to the output of said waveguide pairs for comparing the output of both waveguides of said waveguide pairs and providing a digitized signal therefrom.

6. The electro-optic analog-to-digital converter of claim 5 wherein said electrical conductors comprise elongated signal conductors and elongated ground return conductors disposed adjacent to said waveguide pairs, said signal conductors extending a predetermined distance into the space between said closely-spaced parallel waveguide pairs, and said ground return conductors extending along the outside of each waveguide of said waveguide pairs.

7. The electro-optic analog-to-digital converter of claim 5 wherein said electrical conductors comprise signal conductors and ground return conductors overlaying said waveguide pairs, said signal conductors overlaying a predetermined portion of one waveguide of each of said waveguide pairs, and said ground return conductors overlaying a predetermined portion of the other waveguide of each of said waveguide pairs.

8. The electro-optic analog-to-digital converter of claim 5 wherein said electrical conductors include individual conductors extending a predetermined distance into the space between said closely-spaced parallel waveguide pairs, said predetermined distance being determined by the relation $L_n = 2^{n-1}L_1$, where $n = 1, 2, 3 \ldots$ is the number of the nth pair of waveguides of said plurality of waveguide pairs.

9. An electro-optic analog-to-digital converter having a source of an analog signal, a laser, comparator, and an electro-optic crystal substrate having a plurality of optical waveguides disposed therein and having a plurality of electrical conductors disposed therein, wherein the improvement comprises: said plurality of optical waveguides being disposed as closely-spaced parallel pairs, said plurality of electrical conductors being disposed adjacent to said pairs, said conductors comprising signal conductors and ground return conductors, the proximity of said signal conductors to said pairs defining a coupling region of each of said pairs, said signal conductors and said coupling regions being of different lengths for each of said pairs, the lengths of said signal conductors and said coupling regions being related to a predetermined manner, said laser being coupled to one waveguide of each of said waveguide pairs for applying laser energy thereto, said source of an analog signal being coupled to said plurality of electrical conductors for applying an analog signal thereto and inducing coupling between said one waveguide and the other waveguide of each of said pluraity of waveguide pairs, said comparator being disposed to receive laser energy transmitted by both waveguides of each of said plurality of waveguide pairs and providing a digitized signal therefrom.

10. An electro-optic analog-to-digital converter for digitizing an applied analog signal comprising:
a source of an analog signal;
an electro-optic crystal substrate;
a plurality of closely-spaced parallel optical waveguide pairs disposed in said substrate;
a laser source;
means for simultaneously applying laser energy from said laser source to one waveguide of each of said waveguide pairs;
electrical conductors disposed on said substrate and connected to said source of an analog signal for simultaneously applying said analog signal across a coupling region of each of said plurality of waveguide pairs so as to induce coupling of laser energy between said one waveguide and the other waveguide of each of said waveguide pairs, the lengths of said coupling regions being determined by the relationship $L_n = 2^{n-1}L_1$, where $L_1$ is the coupling region length for a first waveguide pair and $n = 1, 2, 3 \ldots$, identifies a specific pair of said plurality of waveguide pairs, said coupling being proportional to said applied analog signal and to the lengths of said coupling regions; and
means responsive to the output of said waveguide pairs for comparing the output of both waveguides of said waveguide pairs and providing a digitized signal therefrom.

11. A method for digitizing an analog signal comprising the steps of:
applying laser energy to one waveguide of each of a plurality of closely-spaced parallel optical waveguide pairs;
applying an analog electrical signal along a predetermined portion of each of said waveguide pairs to induce coupling between the waveguides of each of said waveguide pairs, the lengths of said predetermined portions of each waveguide pair being related in a binary manner, such that $L_n = 2^{n-1}L_1$, where $L_1$ is the length of the predetermined portion of a first waveguide pair and $n = 1,2,3 \ldots$, identifies the nth pair of waveguide pairs, and $L_n$ is the corresponding length of the nth predetermined portion; and
comparing the laser energy output of each waveguide of said waveguide pairs to provide a digitized signal therefrom.

* * * * *